United States Patent
Ishii

(10) Patent No.: US 9,153,066 B2
(45) Date of Patent: Oct. 6, 2015

(54) IMAGE PROCESSING DEVICE, IMAGING DEVICE, AND IMAGE PROCESSING METHOD

(71) Applicant: Panasonic Corporation, Osaka (JP)

(72) Inventor: Yasunori Ishii, Osaka (JP)

(73) Assignee: PANASONIC INTELLECTUAL PROPERTY MANAGEMENT CO. LTD., Osaka (JP)

( * ) Notice: Subject to any disclaimer, the term of this patent is extended or adjusted under 35 U.S.C. 154(b) by 71 days.

(21) Appl. No.: 14/113,114

(22) PCT Filed: Nov. 13, 2012

(86) PCT No.: PCT/JP2012/007270
§ 371 (c)(1),
(2) Date: Oct. 21, 2013

(87) PCT Pub. No.: WO2013/073167
PCT Pub. Date: May 23, 2013

(65) Prior Publication Data
US 2014/0072205 A1    Mar. 13, 2014

(30) Foreign Application Priority Data
Nov. 17, 2011    (JP) .................. 2011-251944

(51) Int. Cl.
*G06K 9/00*    (2006.01)
*G06T 15/08*    (2011.01)
*G06T 7/00*    (2006.01)

(52) U.S. Cl.
CPC .............. *G06T 15/08* (2013.01); *G06T 7/0075* (2013.01); *G06T 7/0081* (2013.01); *G06T 2207/10012* (2013.01); *G06T 2207/10024* (2013.01)

(58) Field of Classification Search
None
See application file for complete search history.

(56) References Cited

U.S. PATENT DOCUMENTS 6,301,382 B1 * 10/2001 Smith et al. ............. 382/162
7,286,143 B2 * 10/2007 Kang et al. .............. 345/629
(Continued)

FOREIGN PATENT DOCUMENTS

JP    2005-165969    6/2005
JP    2007-520822    7/2007
(Continued)

OTHER PUBLICATIONS

International Search Report issued Jan. 29, 2013 in International (PCT) Application No. PCT/JP2012/007270.
(Continued)

*Primary Examiner* — Jayesh A Patel
(74) *Attorney, Agent, or Firm* — Wenderoth, Lind & Ponack, L.L.P.

(57) ABSTRACT

An image processing device for generating depth data, utilizing the a first image and a second image which are captured from different viewpoints, the image processing device including: a disparity value calculation unit which calculates, for each of plural representative pixels included in pixels in the first image, a disparity value of the representative pixel, based on a positional relationship between the representative pixel and a pixel corresponding to the representative pixel, in the second image; a segmentation unit which partitions the first image into plural segments, based on a similarity between pixel values; and a depth data generation unit which determines, for each segment, a disparity value of the segment, based on the disparity value of the representative pixel included in the segment to generate depth data indicative of depths corresponding to the plural segments.

14 Claims, 13 Drawing Sheets

(56) References Cited

U.S. PATENT DOCUMENTS

| | | | |
|---|---|---|---|
| 8,351,646 B2 * | 1/2013 | Fujimura et al. | 382/103 |
| 8,494,285 B2 * | 7/2013 | Zhang et al. | 382/195 |
| 8,884,949 B1 * | 11/2014 | Lambert et al. | 345/419 |
| 2006/0193511 A1 * | 8/2006 | Kimura et al. | 382/154 |
| 2008/0152191 A1 * | 6/2008 | Fujimura et al. | 382/103 |
| 2008/0259154 A1 * | 10/2008 | Garrison et al. | 348/14.01 |
| 2008/0260288 A1 | 10/2008 | Redert | |
| 2010/0208994 A1 * | 8/2010 | Yao et al. | 382/173 |
| 2011/0164832 A1 * | 7/2011 | Yoon et al. | 382/294 |
| 2012/0087578 A1 * | 4/2012 | Nakajima et al. | 382/164 |
| 2013/0027520 A1 | 1/2013 | Ono et al. | |

FOREIGN PATENT DOCUMENTS

| | | |
|---|---|---|
| JP | 2008-84076 | 4/2008 |
| JP | 2011-203953 | 10/2011 |
| WO | 2005/076215 | 8/2005 |
| WO | 2011/132404 | 10/2011 |

OTHER PUBLICATIONS

David G. Lowe, "Distinctive Image Features from Scale-Invariant Keypoints", International Journal of Computer Vision, 60, 2(2004), pp. 91-110.

Herbert Bay et al., "Speeded-Up Robust Features (SURF)", Computer Vision and Image Understanding (CVIU), vol. 110, No. 3, pp. 346-359, 2008.

Mikio Takagi et al., "New Handbook for Image Analysis (Shinpen Gazou Kaiseki Handbook)", Tokyo University Press, pp. 1333-1337, Sep. 2004.

* cited by examiner (a) Before alignment process (b) After alignment process (a) Before clustering (initial clusters)

(b) After clustering (a) Before segment combination (b) After segment combination

IMAGE PROCESSING DEVICE, IMAGING DEVICE, AND IMAGE PROCESSING METHOD

TECHNICAL FIELD

The present invention relates to an image processing device which generates depth data, using a first image and a second image which are captured from different viewpoints, an imaging device, and an image processing method.

BACKGROUND ART

In recent years, 3D displays which display 3D images are becoming widely popular. In addition, there is increasing need for 3D cameras which capture 3D images to be displayed on such 3D displays. Typical 3D cameras capture stereo images by using two pairs of a lens and a sensor.

Methods of generating depth data indicative of the depth of stereo images using stereo images captured by such a 3D camera are known. For example, corresponding points for each pixel are detected in the stereo images and a disparity value between the corresponding points is calculated, thereby generating depth data. Then, various processing is allowed to be performed on the stereo images by using the so generated depth data.

CITATION LIST

Patent Literature

[PTL 1] Japanese Unexamined Patent Application Publication (Translation of PCT Application) No. 2007-520822

SUMMARY OF INVENTION

Technical Problem

The above conventional methods, however, require detecting corresponding points for each pixel to generate depth data, which increases processing load.

In contrast, a method of assigning a depth value to each of segments obtained by partitioning an image, based on a size of the segment, is disclosed (for example, see Patent Literature (PTL) 1). In the method disclosed in PTL 1, a smaller segment is assigned with a smaller depth value. However, there is no guarantee that the smaller the segment is the closer the subject corresponding to the segment appears. In other words, when generating the depth data by the method disclosed in PTL 1, the accuracy of the depth data undesirably and significantly degrades while processing load can be reduced.

Thus, the present invention provides an image processing device, an imaging device, and an image processing method which can reduce processing load, inhibiting the degradation of accuracy in the depth data, when generating the depth data using the first image and the second image which are captured from different viewpoints.

Solution to Problem

The image processing device according to one aspect of the present invention is an image processing device for generating depth data, utilizing a first image and a second image which are captured from different viewpoints, the image processing device including: a disparity value calculation unit configured to calculate, for each of plural representative pixels included in pixels in the first image, a disparity value of the representative pixel, based on a positional relationship between the representative pixel and a pixel corresponding to the representative pixel, in the second image; a segmentation unit configured to partition the first image into plural segments, based on a similarity between pixel values; and a depth data generation unit configured to determine, for each segment, a disparity value of the segment, based on the disparity value of the representative pixel included in the segment to generate depth data indicative of depths corresponding to the plural segments.

These general and specific aspects may be implemented using a system, a method, an integrated circuit, a computer program, or a computer-readable recording medium such as a CD-ROM, or any combination of systems, methods, integrated circuits, computer programs, or computer-readable recording media such as CD-ROM. Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects of Invention

According to an image processing device of one aspect of the present invention, when generating the depth data using the first image and the second image which are captured from the different viewpoints, processing load can be reduced, inhibiting the degradation of accuracy of the depth data.

DESCRIPTION OF EMBODIMENTS

Figure 1:
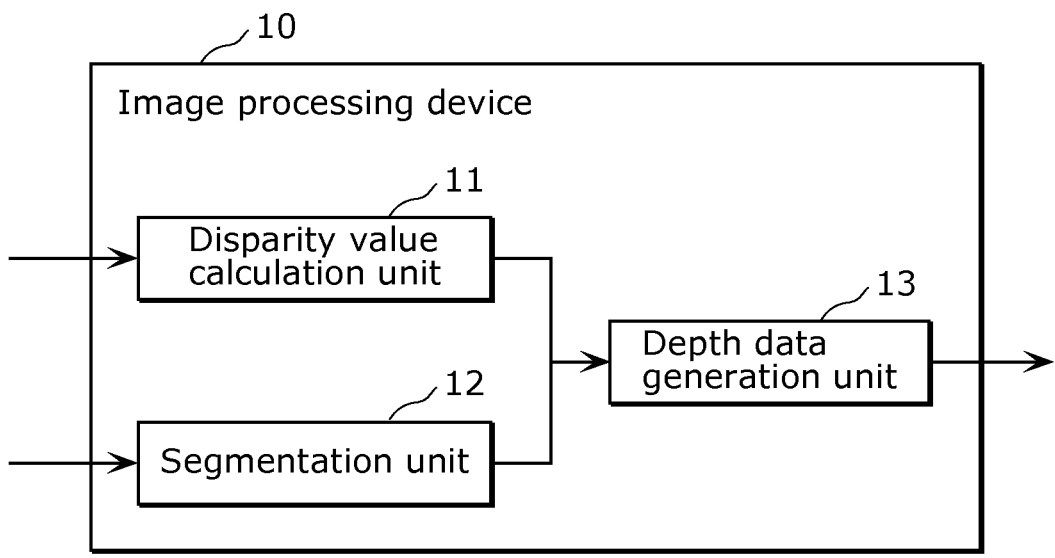
FIG. 1 is a block diagram of the functional configuration of an image processing device according to an embodiment 1.

An image processing device according to one aspect of the present invention is an image processing device for generating depth data, utilizing a first image and a second image which are captured from different viewpoints, the image processing device including: a disparity value calculation unit configured to calculate, for each of plural representative pixels included in pixels in the first image, a disparity value of the representative pixel, based on a positional relationship between the representative pixel and a pixel corresponding to the representative pixel, in the second image; a segmentation unit configured to partition the first image into plural segments, based on a similarity between pixel values; and a depth data generation unit configured to determine, for each segment, a disparity value of the segment, based on the disparity value of the representative pixel included in the segment to generate depth data indicative of depths corresponding to the plural segments.

According to the above configuration, the depth data indicative of the depths corresponding to the segments can be generated based on the disparity value of the representative pixel included in each segment. In other words, to generate the depth data, a pixel which corresponds to the representative pixel may be detected in the second image, which obviates the need for detection of pixels in the second image which correspond to all pixels in the first image. Thus, a reduction in processing load for generating the depth data is possible.

Furthermore, according to the above configuration, the first image is partitioned into the plurality of segments, based on the similarity between the pixel values, thereby reducing the possibility that a plurality of subjects which are different from one another are included in one segment. In other words, the first image is more likely to be partitioned into segments so that regions having a similar depth may more likely to be obtained as one segment. Determining the disparity value for each of the segments thus obtained by partitioning the first image can inhibit degradation in accuracy of the depth data indicative of the depths corresponding to the segments.

Moreover, preferably, the image processing device further includes a segment combine unit configured to combine, when the plural segments include an empty segment which includes no representative pixel, the empty segment and a segment adjacent to the empty segment together, wherein the depth data generation unit generates the depth data, based on a segment obtained by the segment combine unit combining the empty segment and the segment adjacent to the empty segment together According to the above configuration, when plural segments each include an empty segment, the empty segment and adjacent segment can be combined together. Thus, there is no need for the segmentation unit to partition the first image into a plurality of segments so that each segment may always include a representative pixel. In other words, the segmentation can be carried out without considering the correspondence with the representative pixel. As a result, the segmentation and the disparity value calculation on the representative pixel can be processed in parallel, thereby speeding up the depth data generation process.

Moreover, preferably, when the empty segment is adjacent to plural segments, the segment combine unit selects at least one segment from among the plural segments, based on a color similarity, and combines the selected at least one segment and the empty segment together According to the above configuration, segments having a similar color can be combined together. In other words, regions having a similar color are handled as one segment, and thus, regions having a similar depth are more likely to be set as one segment. By determining the disparity value for each of the segments thus obtained, the depth data indicative of the depths corresponding to the segments can be generated more accurately.

Moreover, preferably, when a segment among the plural segments includes two or more representative pixels, the depth data generation unit determines a median value or a mean value of disparity values of the two or more representative pixels as the disparity value of the segment.

According to the above configuration, when a segment includes two or more representative pixels, a median value or a mean value of the disparity values of the two or more representative pixels can be determined as the disparity value of the segment. Thus, the disparity value of the segment can readily be determined, thereby reducing the processing load for generating the depth data. Moreover, an error between the disparity value of the segment and the disparity value of each of the pixels included in the segment can be reduced to relatively small, and thus the depth data can be generated more accurately.

Moreover, preferably, the depth data generation unit interpolates, for each segment, using a disparity value of at least one representative pixel included in the segment, a disparity value of another pixel included in the segment to calculate a disparity value of each pixel included in the segment, and generates a depth map indicative of depths of the pixels as the depth data, based on the calculated disparity values of the pixels.

According to the above configuration, for each segment, the disparity values of other pixels included in the segment can be interpolated using the disparity value of at least one representative pixel included in a segment. Thus, the disparity value of each pixel can be obtained by interpolation, thereby generating the depth data more accurately.

Moreover, preferably, the segmentation unit partitions the first image into plural segments by clustering based on a similarity defined using pixel values and pixel locations.

According to the above configuration, the first image can be partitioned into a plurality of segments by clustering based on a similarity defined using the pixel values and the pixel locations. Thus, the first image can be highly precisely partitioned into a plurality of segments so that a plurality of subjects which are different from one another are included in one segment. As a result, more accurate generation of the depth data is possible.

Moreover, preferably, the clustering is k-means clustering.

According to the above configuration, the first image can be partitioned into a plurality of segments by k-means clustering. Thus, highly precise partition of the first image into a plurality of segments is possible so that a plurality of subjects which are different from one another may not be included in one segment. Furthermore, the segmentation by relatively simplified processing is possible, and thus reduction of processing load for generating the depth data is possible as well.

Moreover, preferably, the image processing device further includes a feature point calculation unit configured to calculate a feature point in the first image, as one of the representative pixels.

According to the above configuration, the feature points can be calculated as the representative pixels. Thus, the detection of pixels in the second image that correspond to the representative pixels is facilitated, thereby reducing the processing load.

Moreover, preferably, the image processing device further includes an alignment processing unit configured to perform, using the feature point, an alignment process for rectifying the first image and the second image, wherein the disparity value calculation unit calculates the disparity value of the representative pixel, using the first image and the second image on which the alignment process has been performed According to the above configuration, an alignment process for rectifying the first image and the second image can be performed. In general, when a multi-view image, such as stereo images, is captured, the alignment process is performed on the mufti-view image. In the alignment process, the feature points are calculated and corresponding points are detected. In other words, the disparity value of the representative pixel can be calculated appropriating results of calculating the feature points and detecting the corresponding points in the alignment process. Thus, the reduction in processing load for generating the depth data is possible.

Moreover, preferably, the image processing device further includes an image processing unit configured to separate, based on the depth data, the first image into a foreground region and a background region, and apply blurring to the background region According to the above configuration, the first image can be separated based on the depth data into the foreground region and the background region, and blurring can be applied to the background region. Depth data for separating the first image into the foreground region and the background region may not necessarily have a high definition in pixel units. Thus, the depth data based on the disparity values of the segments can be advantageously utilized.

Moreover, preferably, the image processing device further includes an image processing unit configured to separate, based on the depth data, the first image into a foreground region and a background region, and synthesize the foreground region with a third image different from the first image and the second image.

According to the above configuration, the first image can be partitioned based the depth data into the foreground region and the background region and synthesize the foreground region with other image corresponding to the background region. Depth data for separating the first image into the foreground region and the background region may not necessarily have a high definition in pixel units. Thus, the depth data based on the disparity values of the segments can be advantageously utilized.

Moreover, the image processing device may be configured as an integrated circuit.

Moreover, an imaging device according to one aspect of the present invention includes the image processing device and an imaging unit configured to capture the first image and the second image.

According to the above configuration, the same advantageous effects as obtained by the image processing device are achieved.

These general and specific aspects may be implemented using a system, a method, an integrated circuit, a computer program, or a computer-readable recording medium such as a CD-ROM, or any combination of systems, methods, integrated circuits, computer programs, or computer-readable recording media such as CD-ROM. Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Hereinafter, embodiments will be described, with reference to the accompanying drawings. It should be noted that the embodiments described below are comprehensive or specific illustration of the present invention. Values, shapes, materials, components, disposition or a form of connection between the components, steps, and the order of the steps are merely illustrative, and are not intended to limit the appended claims. Moreover, among components of the below non-limiting embodiments, components not set forth in the independent claims indicating the top level concept of the present invention will be described as optional components.

Embodiment 1

FIG. 1 is a block diagram of the functional configuration of an image processing device 10 according to an embodiment 1. The image processing device 10 generates depth data of a first image, utilizing the first image and a second image (for example, stereo images) which are captured from different viewpoints. The first image and the second image are, for example, stereo images (a left-eye image and a right-eye image).

As shown in FIG. 1, the image processing device 10 according to the present embodiment includes a disparity value calculation unit 11, a segmentation unit 12, and a depth data generation unit 13.

The disparity value calculation unit 11 detects, for each representative pixel in the first image, a corresponding pixel in the second image to calculate a disparity value between the representative pixel and the corresponding pixel. In other words, the disparity value calculation unit 11 calculates a disparity value for some of pixels in the first image.

Here, the representative pixels are some of the pixels included in the first image. In the present embodiment, the representative pixel is a pixel at a predetermined position in an image.

The corresponding pixel is a pixel which corresponds to a representative pixel. Specifically, the corresponding pixel is a pixel in the second image which is similar to a representative pixel in the first image. The two pixels, the representative pixel and the corresponding pixel, are also referred to as corresponding points. The corresponding pixels can be detected by, for example, block matching.

The disparity value between the representative pixel and the corresponding pixel is a value representing a displacement between a position of the representative pixel and a position of the corresponding pixel. Using the disparity value, a distance (depth) from an imaging device to a subject can be calculated based on triangulation. It should be noted that the disparity value between the representative pixel and the corresponding pixel will simply be referred to as a disparity value of the representative pixel.

The segmentation unit 12 partitions the first image into a plurality of segments, based on a similarity between pixel values. Specifically, the segmentation unit 12 partitions the first image into a plurality of segments so that pixels having a similar pixel value may be included in one segment. In the present embodiment, the segmentation unit 12 partitions the first image into a plurality of segments so that each resultant segment may include at least one representative pixel.

Here, the segment corresponds to a region in the first image. A process of partitioning the first image into a plurality of segments will also be referred to as segmentation, hereinafter.

The pixel value is a value of a pixel included in an image. The pixel value is a value indicating, for example, brightness, color, lightness, hue, or saturation of a pixel, or a combination thereof.

The depth data generation unit 13 determines, for each segment, a disparity value of the segment, based on a disparity value of a representative pixel included in the segment to generate depth data. Specifically, the depth data generation unit 13 generates the depth data, based on disparity values each determined for a segment.

The depth data generated here indicates depths corresponding to the segments. For example, the depth data may be data in which segment information indicating a position or the size of a segment is associated with a depth value of the segment. Also for example, the depth data may be a depth map (depth image) which has depth values as pixel values.

It should be noted that depth data does not necessarily include a depth value and may include data indicative of depth. For example, the depth data may include the disparity value as the data indicative of the depth.

Next, processing operations of the image processing device 10 configured as set forth above will be described.

Figure 2:
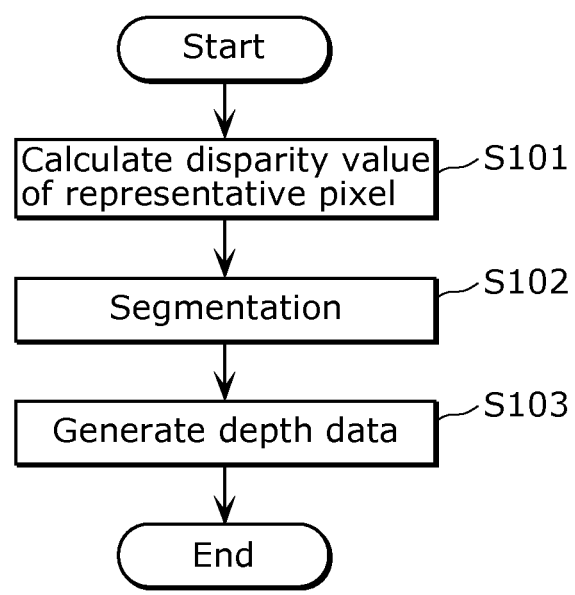
FIG. 2 is a flowchart illustrating processing operations of the image processing device according to the embodiment 1.
Figure 3:
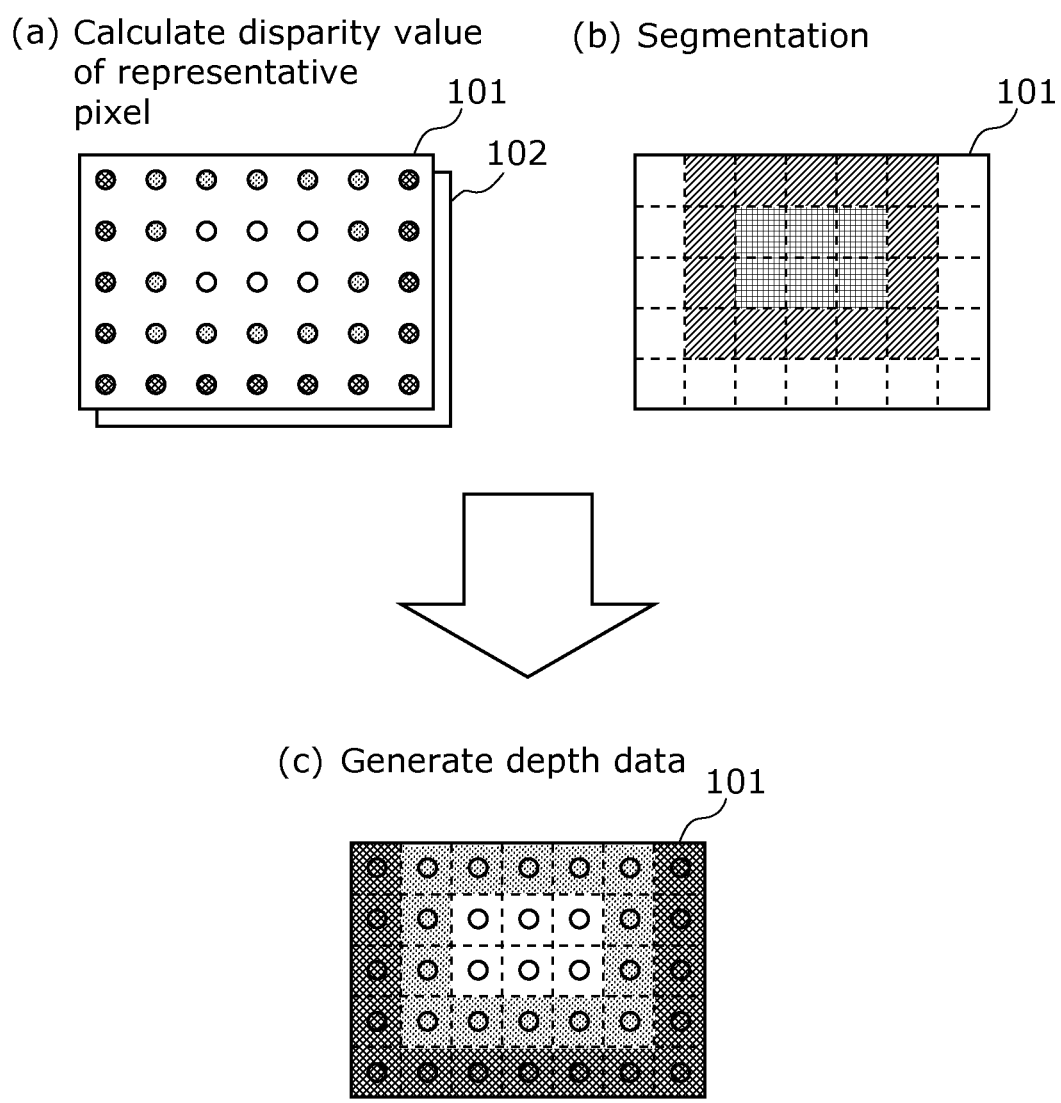
FIG. 3 is a diagram illustrating processing operations of the image processing device according to the embodiment 1.

FIG. 2 is a flowchart illustrating processing operations of the image processing device 10 according to the embodiment 1. FIG. 3 is a diagram illustrating example processing operations of the image processing device 10 according to the embodiment 1.

First, the disparity value calculation unit 11 calculates a disparity value of each representative pixel (S101). As shown in (a) of FIG. 3 for example, the disparity value calculation unit 11 detects, for each representative pixel at a predetermined position in a first image 101, a corresponding pixel in a second image 102. Then, the disparity value calculation unit 11 calculates a disparity value of the representative pixel, based on the positional relationship between the representative pixel and the corresponding pixel.

Next, the segmentation unit 12 partitions the first image 101 into a plurality of segments (S102). As shown in (b) of FIG. 3 for example, the segmentation unit 12 partitions the first image 101 into a plurality of rectangular segments having a predetermined size. Here, in (b) of FIG. 3, the first image 101 is partitioned into segments, so that each segment includes one representative pixel.

Last, the depth data generation unit 13 generates depth data, based on the disparity values each for a segment (S103). Here, as shown in (c) of FIG. 3, the depth data generation unit 13 determines the disparity value of each segment, based on the disparity value of the representative pixel included in the segment.

As described above, according to the image processing device 10 of the present embodiment, the depth data indicative of the depths corresponding to the segments can be generated based on the disparity value of the representative pixel included in each segment. In other words, to generate the depth data, a pixel which corresponds to the representative pixel may be detected in the second image, which obviates the need for detection of pixels in the second image which correspond to all pixels in the first image. Thus, a reduction in processing load for generating the depth data is possible.

Furthermore, according to the image processing device 10 of the present embodiment, the first image is partitioned into the plurality of segments, based on the similarity between the pixel values, thereby reducing the possibility that a plurality of subjects which are different from one another are included in one segment. In other words, the first image is more likely to be partitioned into segments so that regions having a similar depth may more likely to be obtained as one segment. Determining the disparity value for each of the segments thus obtained by partitioning the first image can inhibit degradation in accuracy of the depth data which indicates the depths corresponding to the segments.

It should be noted that while in FIG. 2, the segmentation (S102) is performed after the disparity value calculation (S101), the processing may not necessarily be performed in this order. In other words, the disparity value calculation (S101) may be performed after the segmentation (S102). In this case, the disparity value calculation unit 11 may handle as the representative pixel, for example, a pixel at a centroid position of each of the segments obtained by the segmentation unit 12 partitioning the first image.

Alternatively, the disparity value calculation (S101) and the segmentation (S102) may be performed in parallel. This can speed up the processing.

Embodiment 2

Next, an embodiment 2 will be described with reference to the accompanying drawings.

Figure 4:
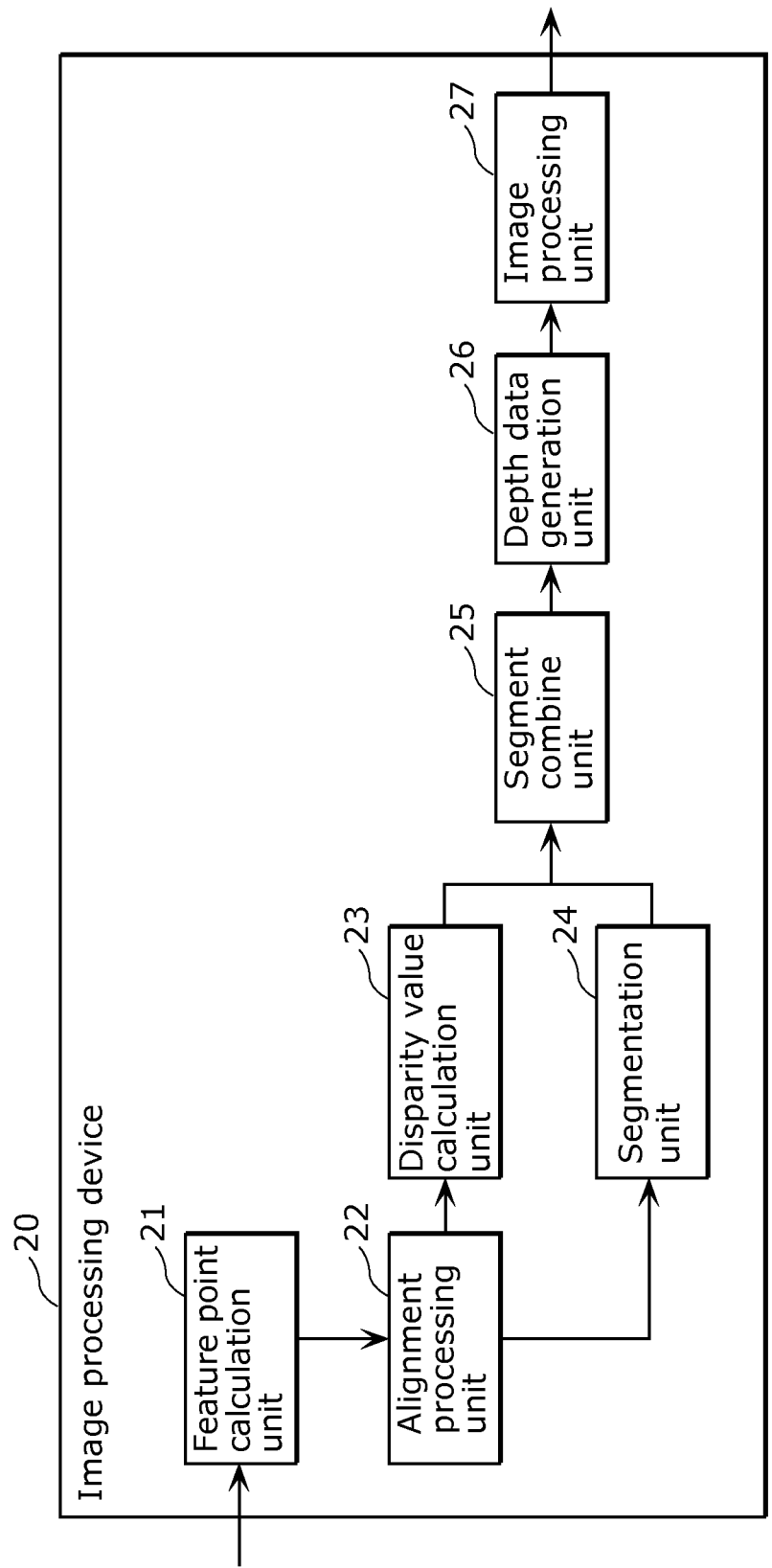
FIG. 4 is a block diagram of the functional configuration of an image processing device according to an embodiment 2.

FIG. 4 is a block diagram of the functional configuration of an image processing device 20 according to the embodiment 2. The image processing device 20 according to the present embodiment includes a feature point calculation unit 21, an alignment processing unit 22, a disparity value calculation unit 23, a segmentation unit 24, a segment combine unit 25, a depth data generation unit 26, and an image processing unit 27.

The feature point calculation unit 21 calculates feature points in a first image as representative pixels. Specifically, the feature point calculation unit 21 calculates feature points, using features extracted by a feature extraction method. As the feature extraction method, for example, scale invariant feature transform (SIFT) disclosed in Patent Literature (PTL) 1 (David G. Lowe, "Distinctive image features from scale-invariant keypoints", International Journal of Computer Vision, 60, 2 (2004), pp. 91 to 110.) can be employed. Alternatively, as the feature extraction method, speeded up robust features (SURF) disclosed in PTL 2 (Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346 to 359, 2008) can be employed as well.

The alignment processing unit 22 performs an alignment process for rectifying the first image and a second image, using the calculated feature points. Specifically, the alignment processing unit 22 detects, based on the feature, a point in the second image which corresponds to the feature point. Furthermore, the alignment processing unit 22 performs the alignment process by utilizing the positional relationship between two points (the corresponding points) which are the point detected in the second image and the feature point.

The disparity value calculation unit 23 calculates the disparity value of the representative pixel, using the first image and the second image on which the alignment process has been performed. In other words, the disparity value calculation unit 23 calculates the disparity value for each feature point, utilizing the positional relationship between the corresponding points.

The segmentation unit 24 partitions the first image into a plurality of segments by clustering based on a similarity defined using the pixel values and the pixel locations. Details of the clustering will be described below.

When an empty segment is included in the plurality of segments, the segment combine unit 25 combines the empty segment and a segment adjacent to the empty segment together. Here, the empty segment refers to a segment which includes no representative pixel.

When no representative pixel is included in the combined segment, the segment combine unit 25 repeats combining the empty segment with further adjacent segments. In other words, the segment combine unit 25 combines segments so that each segment may include at least one representative pixel.

The depth data generation unit 26 generates the depth data, based on the segments obtained by the segment combine unit 25 combining segments. Specifically, the depth data generation unit 26, for example, determines a disparity value of the representative pixel included in the segment as the disparity value of the segment. Also, when two or more representative pixels are included in the segment, the depth data generation unit 26 determines, as a disparity value, a median value or a mean value of the disparity values of the two or more representative pixels, for example.

The image processing unit 27 performs image processing on at least one of the first image and the second image, based on the generated depth data. For example, the image processing unit 27 separates the first image into a foreground region and a background region, based on the depth data. Then, the image processing unit 27 applies blurring to the background region. Also for example, the image processing unit 27 may synthesize the foreground region with a third image different from the first image and the second image.

Such depth data for separating the first image into the foreground region and the background region may not necessarily have a high definition in pixel units. In other words, the depth data based on the disparity values of the segments can be advantageously utilized.

Next, processing operations of the image processing device 20 configured as set forth above will be described.

Figure 5:
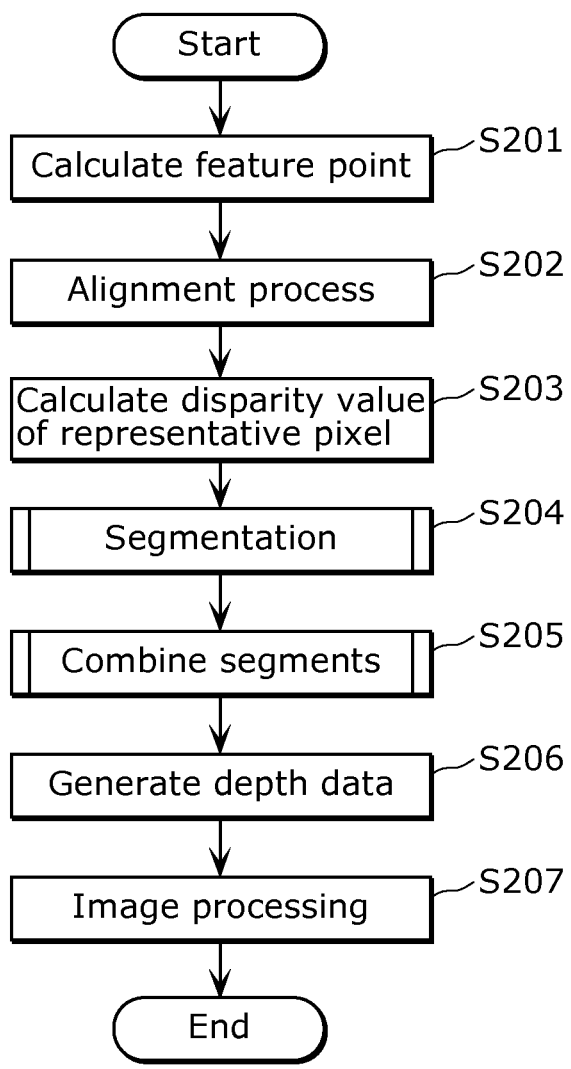
FIG. 5 is a flowchart illustrating processing operations of the image processing device according to the embodiment 2.

FIG. 5 is a flowchart illustrating the processing operations of the image processing device 20 according to the embodiment 2.

First, the feature point calculation unit 21 calculates feature points in the first image as representative pixels (S201). The alignment processing unit 22 performs an alignment process for rectifying the first image and the second image, using the calculated feature points (S202).

The disparity value calculation unit 23 calculates the disparity values of the representative pixels, using the first image and the second image on which the alignment process has been performed (S203). The segmentation unit 24 partitions the first image into a plurality of segments by clustering based on the similarity defined using the pixel values and the pixel locations (S204).

The segment combine unit 25 combines a plurality of segments so that each resultant segment may include at least one representative pixel (S205). The depth data generation unit 26 generates depth data, based on the segments obtained by the segment combine unit 25 combining segments (S206). Last, the image processing unit 27 performs the image processing on at least one of the first image and the second image, based on the generated depth data (S207).

In the following, details of such processing operations of the image processing device 20 will be described, with reference to the accompanying drawings. First, details of the alignment process (S202) will be described, with reference to FIG. 6 and FIG. 7.

Figure 6:
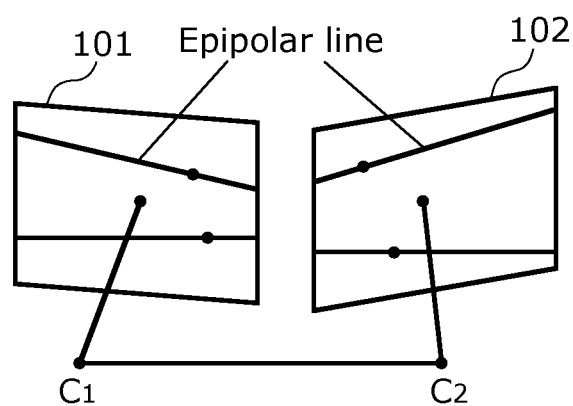
FIG. 6 is a diagram illustrating an overview of an alignment process according to the embodiment 2.
Figure 6:
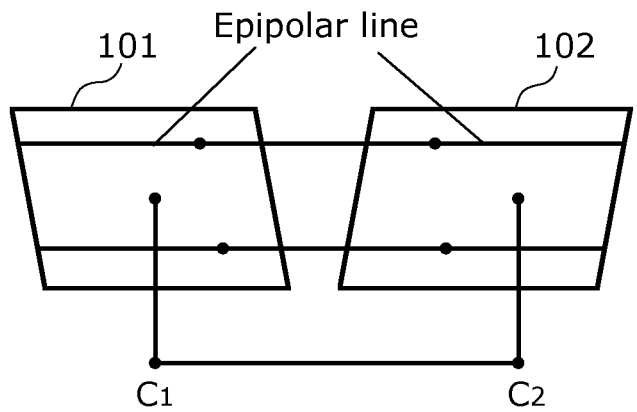

FIG. 6 is a diagram illustrating an overview of the alignment process according to the embodiment 2.

Stereo images captured by a stereo camera are in most cases not parallel to each other as shown in (a) of FIG. 6. In other words, the epipolar line is in many cases not horizontal in each of the first image 101 and the second image 102.

Thus, the alignment processing unit 22 rectifies the first image 101 and the second image 102 so that an epipolar line of each of the first image 101 and the second image 102 may be horizontal as shown in (b) FIG. 6.

Figure 7:
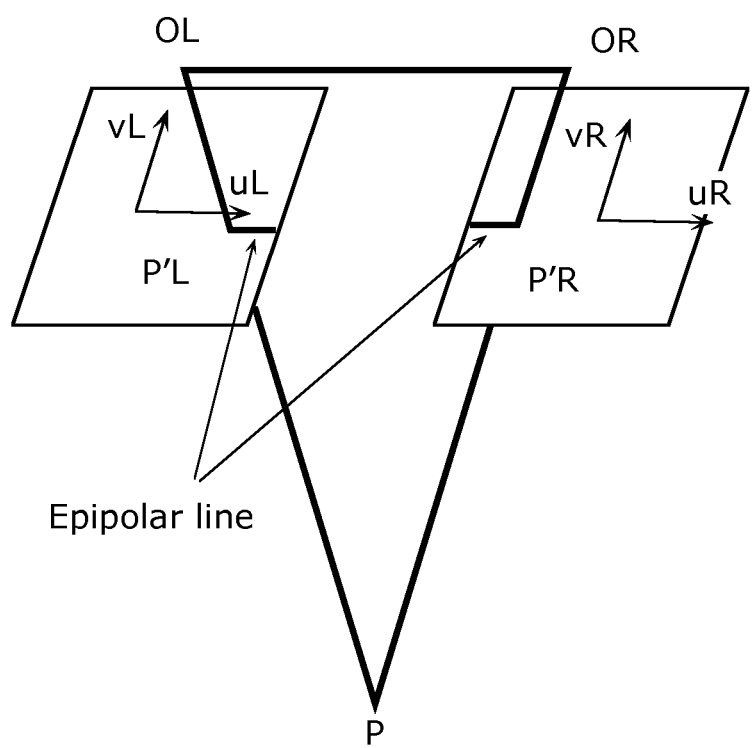
FIG. 7 is a diagram illustrating an example of the alignment process according to the embodiment 2.

FIG. 7 is a diagram illustrating an example of the alignment process according to the embodiment 2. Specifically, FIG. 7 is a diagram illustrating an alignment process based on a method disclosed in PTL 3 ("Handbook of image analysis" (Mikio TAKAGI and Haruhisa SHIMODA, University of Tokyo Press, September, 2004, pp. 1333 to 1337)).

An image L and an image R are stereo images in which an object P is captured. A point P'R on the image R which corresponds to a point P'L on the image L is on a straight line at which the image R intersects with a plane which includes projection centers OL and OR of the two images and the point P'L on the image L.

The straight line is referred to as an epipolar line. The plane which includes the object P and the projection centers OL and OR of the two images will be referred to as an epipolar plane.

In other words, the epipolar line is a line of intersection of the epipolar plane and each of image projection planes of the two images L and R. In such an unrectified image, the epipolar line is not parallel to a scan direction (here, the horizontal direction) of the image. Thus, two-dimensional search is required in matching the corresponding points, and therefore increasing the complexity. Thus, to simplify the search, the two stereo images are rectified by a method indicated below.

Consider a coordinate system (x', y', z') where the projection center OL of the image L is origin, x' axis and y' axis are parallel to UL axis and VL axis, respectively. The coordinate system will be referred to as a model coordinate system. In the model coordinate system, a position of the projection center of the image L is represented by (0, 0, 0), and the posture is represented by (0, 0, 0), a position of the projection center of the image R is represented by (Bx', By', Bz') and the posture is represented by (ω', φ', X'). Coordinate transformations between the model coordinate system and virtual projected plane coordinate systems of the images L and R are represented by the following mathematical equations 1 and 2, respectively,

[Eq. 1]

$$\begin{bmatrix} x'L \\ y'L \\ z'L \end{bmatrix} = \begin{bmatrix} uL \\ vL \\ -cL \end{bmatrix} \quad (\text{Eq. 1})$$

[Eq. 2]

$$\begin{bmatrix} x'R \\ y'R \\ z'R \end{bmatrix} = \begin{bmatrix} 1 & 0 & 0 \\ 0 & \cos\omega' & -\sin\omega' \\ 0 & \sin\omega' & \cos\omega' \end{bmatrix} \begin{bmatrix} \cos\phi' & 0 & \sin\phi' \\ 0 & 1 & 0 \\ -\sin\phi' & 0 & \cos\phi' \end{bmatrix}$$

$$\begin{bmatrix} \cos\chi' & -\sin\chi' & 0 \\ \sin\chi' & \cos\chi' & 0 \\ 0 & 0 & 1 \end{bmatrix} \begin{bmatrix} uR \\ vR \\ -cR \end{bmatrix} + \begin{bmatrix} 1 \\ by' \\ bz' \end{bmatrix} \quad (\text{Eq. 2})$$

wherein by'=By'/Bx' and bz'=Bz'/Bx' where Bx' is a unit length.

Unknowns in the coordinate transformation equations are (by', bz') and (ω', φ', X') which are related to the image R. The five unknowns are determined so as to satisfy the following coplanar conditions (mathematical equation 3).

[Eq. 3]

$$\begin{vmatrix} 1 & by' & bz' \\ x'L & y'L & z'L \\ x'R & y'R & x'R \end{vmatrix} = 0 \quad (\text{Eq. 3})$$

First, five or more points which are the same point in the three-dimensional coordinate are selected in each of the two images. Then, virtual projected plane coordinates of the points are determined. Next, using the determined virtual projected plane coordinates, a least-squares method is applied to mathematical equation 3 thereby determining (by', bz') and (ω', φ', X').

Next, consider coordinate transformation given by the following mathematical equations 4 and 5.

[Eq. 4]
$$\begin{bmatrix} u'L \\ v'L \end{bmatrix} = \begin{bmatrix} x'L \\ y'L \end{bmatrix} = \begin{bmatrix} uL \\ vL \end{bmatrix} \quad (Eq.\ 4)$$

[Eq. 5]
$$\begin{bmatrix} u'R \\ v'R \end{bmatrix} = \frac{CL}{z'R - bz'} \begin{bmatrix} x'R - 1 \\ y'R - by' \end{bmatrix} \quad (Eq.\ 5)$$

An image L' (u'L, v'L) and an image R' (u'L, v'L) after the coordinate transformations have been performed thereon are images rearranged along with the epipolar lines. On the two images (the image L' and the image R'), the v' coordinates at the corresponding points are the same. In other words, in the images after the coordinate transformations, the corresponding points may be searched in a lateral direction, simplifying the search for the corresponding points. This transforms the image L into the new image L'.

In other words, the disparity value calculation unit 23 searches for pixels in the second image 102 that correspond to the representative pixels in the first image 101, using the first image 101 and the second image 102 thus rectified, thereby calculating the disparity value of each representative pixel in a simplified manner.

While the solution assuming the central projection has been described with reference to FIG. 6, the similar processing is possible for perspective projection, weak perspective projection, and the like by using a geometrical model corresponding to an imaging system.

Next, the segmentation (S204) will be described in detail, with reference to FIG. 8 to FIG. 11. Here, the segmentation based on k-means clustering will be described by way of example of the segmentation.

Figure 8:
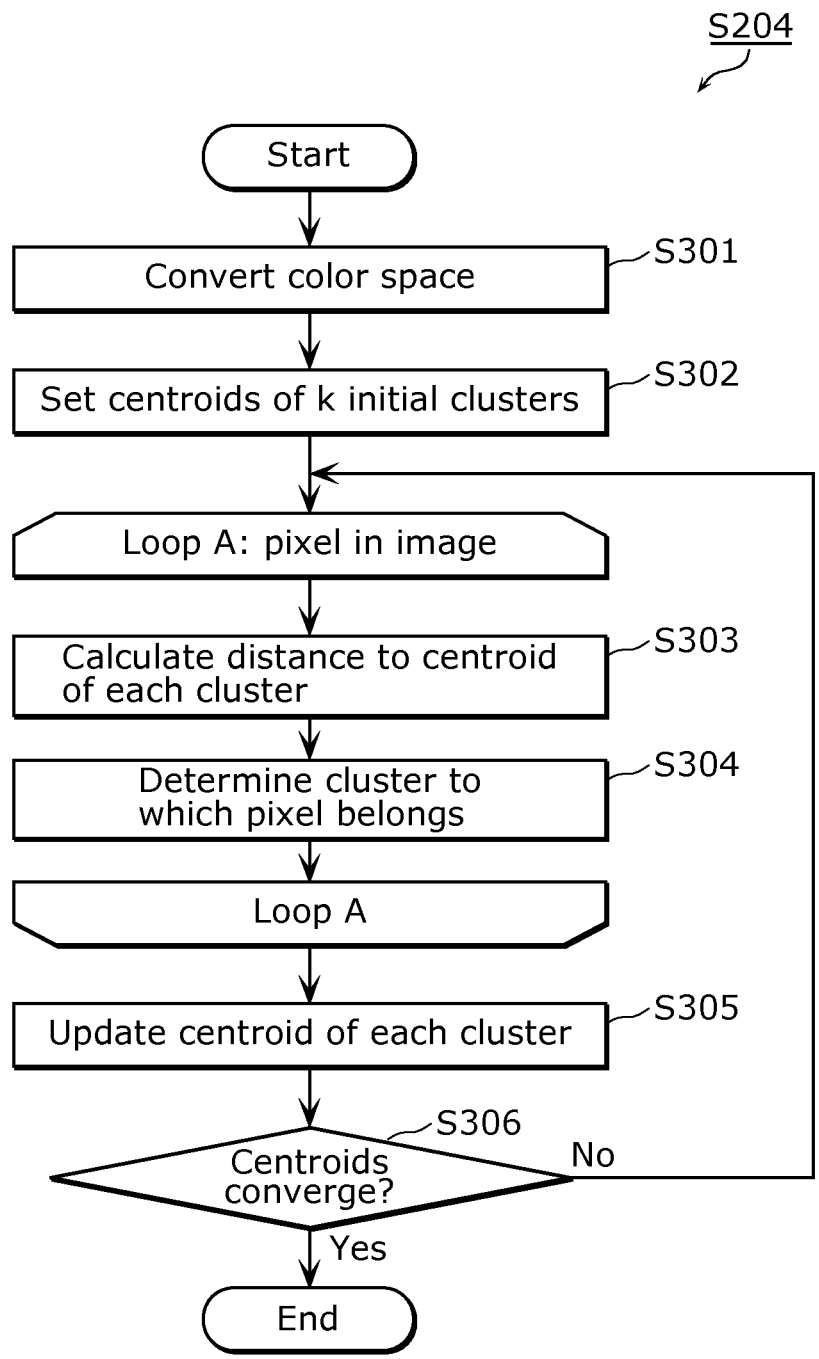
FIG. 8 is a flowchart illustrating details of segmentation according to the embodiment 2.
Figure 9:
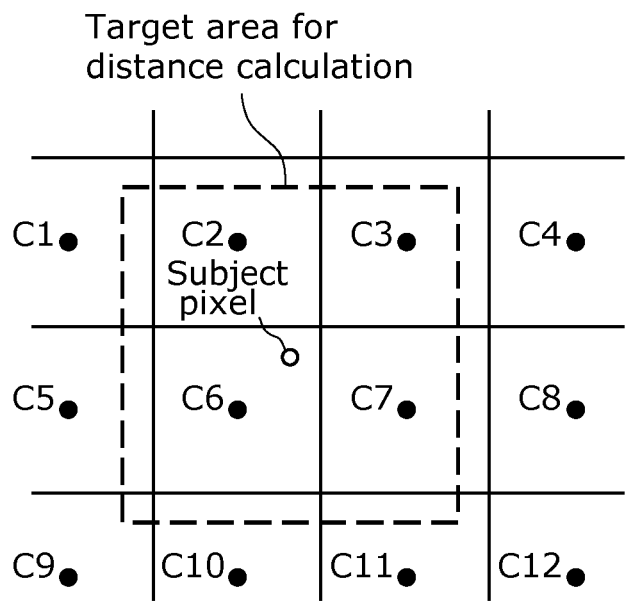
FIG. 9 is a diagram illustrating the segmentation according to the embodiment 2.
Figure 10:
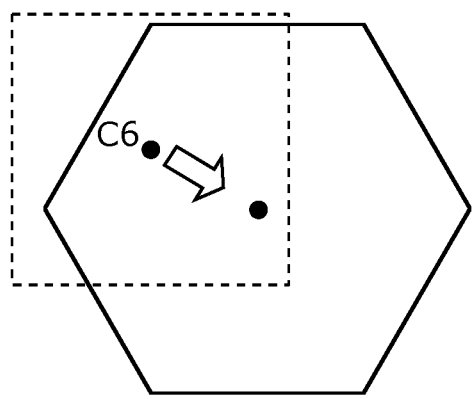
FIG. 10 is a diagram illustrating the segmentation according to the embodiment 2.
Figure 11:
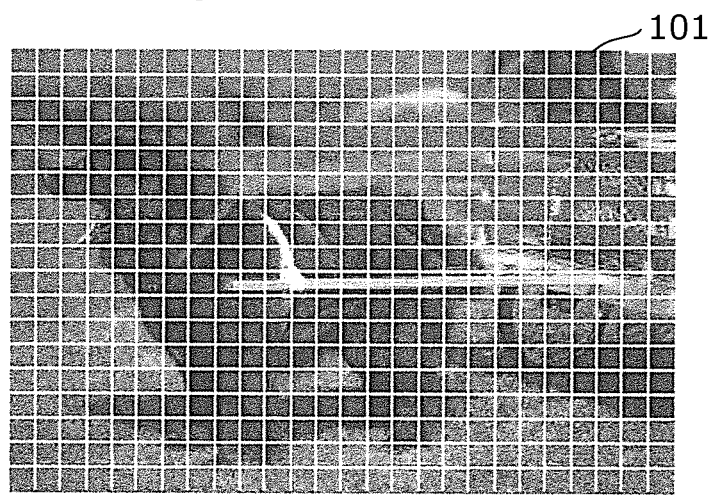
FIG. 11 is a diagram showing an example of a result of the segmentation according to the embodiment 2.
Figure 11:
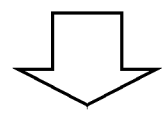
Figure 11:
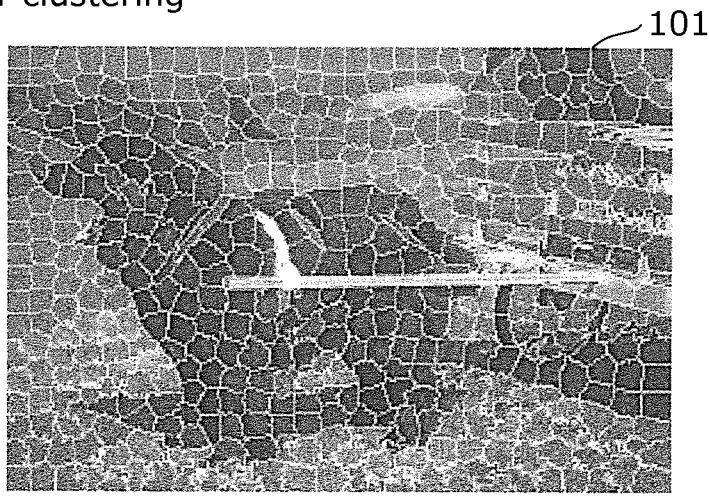

FIG. 8 is a flowchart illustrating details of the segmentation according to the embodiment 2. FIG. 9 is a diagram illustrating the segmentation according to the embodiment 2. FIG. 10 is a diagram illustrating the segmentation according to the embodiment 2. FIG. 11 is a diagram showing an example of a result of the segmentation according to the embodiment 2.

As shown in FIG. 8, the segmentation unit 24, first, converts color spaces of the first image and the second image (S301). Specifically, the segmentation unit 24 converts the RGB color spaces of the first image and the second image into the Lab color spaces.

The Lab color space is a perceptual equal color space. In other words, in the Lab color space, change in color value matches the same amount of change in the colors perceived by humans. Thus, the segmentation unit 24 performs the segmentation on the first image in the Lab color space, thereby partitioning the first image along with subject boundaries perceived by humans.

Next, the segmentation unit 24 sets centroids of k (k: an integer greater than or equal to 2) initial clusters (S302). The centroids of k initial clusters are set so as to be, for example, evenly arranged on the first image. Here, the centroids of the k initial clusters are set so that a space between adjacent centroids may be S (pixel).

Subsequently, processing of steps S303 and S304 is performed on each pixel of the first image. Specifically, the segmentation unit 24 calculates a distance Ds of each pixel to the centroid of each cluster (S303). The distance Ds corresponds to a value indicative of the similarity defined using the pixel values and the pixel locations. Here, a smaller distance Ds indicates a higher similarity of a pixel to the centroid of cluster.

As shown in FIG. 9, the segmentation unit 24 calculates the distances Ds of a subject pixel i only to centroids Ck positioned within a target area for the distance calculation. Here, the target area for the distance calculation is set to an area ranging from a position of the subject pixel i to positions which have spaces therebetween in the horizontal direction and the vertical direction are less than or equal to a space S between the centroids of the initial clusters. In other words, the segmentation unit 24 calculates a distance of the subject pixel i to each of centroids C2, C3, C6, and C7. The target area for the distance calculation is set in this manner, thereby further reducing computation load than calculating distances of the subject pixel i to all centroids.

The distance Ds of the pixel i (pixel location (xi, yi), pixel value (li, ai, bi)) to the centroid Ck (pixel location (xk, yk), pixel value (lk, ak, bk)) is calculated by the following mathematical equation 6.

[Eq. 6]
$$D_s = d_{lab} + \frac{m}{S} d_{xy} \quad (Eq.\ 6)$$
$$d_{lab} = (l_k - l_i)^2 + (a_k - a_i)^2 + (b_k - b_i)^2$$
$$d_{xy} = (x_k - x_i)^2 + (y_k - y_i)^2$$

where m is a coefficient for balancing effects to be made on the distance Ds by a distance dlab based on the pixel value and a distance dxy based on the pixel location. The coefficient m may be predetermined experimentally or empirically.

Next, using the distance Ds of the subject pixel i to each centroid in this manner, the segmentation unit 24 determines a cluster to which the subject pixel i belongs (S304). Specifically, the segmentation unit 24 determines, as the cluster to which the subject pixel i belongs, a cluster that has a centroid the distance Ds thereto from the subject pixel i is a least.

By repeating such processing of steps S303 and S304 for each pixel included in the first image, a cluster to which each pixel belongs is determined.

Next, the segmentation unit 24 updates the centroid of each cluster (S305). For example, as a result of the determination of the cluster to which each pixel belongs in step S304, the segmentation unit 24 updates the pixel value and the pixel location of the centroid C6 when a rectangular cluster transforms to a hexagonal cluster as shown in FIG. 10.

Specifically, the segmentation unit 24 calculates a pixel value (lk_new, ak_new, bk_new) and a pixel location (xk_new, yk_new) of the new centroid, according to the following mathematical equation 7.

[Eq. 7]

$$l_{k\_new} = \frac{1}{N} \sum_{i=0, i \in k}^{N} l_i;$$

$$a_{k\_new} = \frac{1}{N} \sum_{i=0, i \in k}^{N} a_i;$$

$$b_{k\_new} = \frac{1}{N} \sum_{i=0, i \in k}^{N} b_i$$

$$x_{k\_new} = \frac{1}{N} \sum_{i=0, i \in k}^{N} x_i;$$

$$y_{k\_new} = \frac{1}{N} \sum_{i=0, i \in k}^{N} y_i$$

(Eq. 7)

Here, when the centroids of the clusters converge (Yes in S306), the segmentation unit 24 ends the processing. In other words, when there is no change in centroid of each cluster before and after the update in step S305, the segmentation unit 24 ends the segmentation. On the other hand, when the centroids of clusters do not converge (No in S306), the segmentation unit 24 repeats the processing of steps S303 to S305.

As described above, the segmentation unit 24 can partition the first image into a plurality of segments by clustering (here, the k-means clustering) based on the similarity defined using the pixel values and the pixel locations. Thus, the segmentation unit 24 can partition the first image into a plurality of segments as shown in FIG. 11, in accordance with the characteristics of a region of a subject included in the first image.

In other words, the segmentation unit 24 is allowed to partition the first image into a plurality of segments so that the same subject may be included in one segment. As a result, the disparity values of pixels in each segment are similar. Thus, the accuracy of the disparity value determined for each segment improves. In other words, the depth data can be generated more accurately. Furthermore, since the k-means clustering is relatively simple clustering, the reduction in processing load for generating the depth data is possible as well.

Next, the segment combination (S205) will be described in detail, with reference to FIG. 12 and FIG. 13. Here, segment combination based on a color similarity will be described by way of example of the segment combination.

Figure 12:
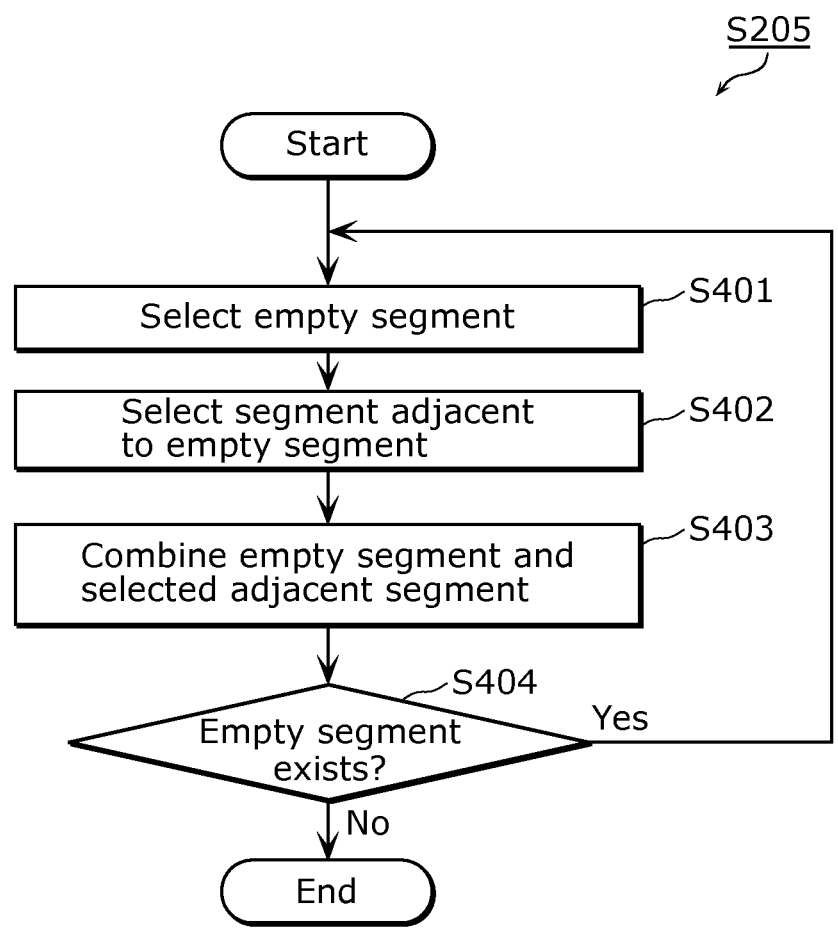
FIG. 12 is a flowchart illustrating details of a segment combine process according to the embodiment 2.

FIG. 12 is a flowchart illustrating details of the segment combine process according to the embodiment 2. FIG. 13 is a diagram illustrating the segment combine process according to the embodiment 2.

As shown in FIG. 12, the segment combine unit 25, first, selects an empty segment from among the plurality of segments obtained by the segmentation unit 24 partitioning the first image (S401). The empty segment refers to a segment which includes no representative pixel.

The segment combine unit 25 selects a segment (hereinafter, also referred to as an adjacent segment) adjacent to the selected empty segment (S402). Here, when the empty segment is adjacent to a plurality of segments, the segment combine unit 25 selects at least one segment, based on a color similarity, from among the plurality of segments. In other words, the segment combine unit 25 selects an adjacent segment that has a most similar color to the empty segment, as a segment to be combined.

Preferably, the color similarity is evaluated in YUV color space or RGB color space. The segment combine unit 25 does not necessarily select only one adjacent segment. For example, the segment combine unit 25 may select a plurality of adjacent segments which have values, which indicates the color similarity, greater than or equal to a threshold.

The segment combine unit 25 combines the empty segment selected in step S401 and the adjacent segment selected in step S402 together (S403). In other words, the segment combine unit 25 combines the selected empty segment and the selected adjacent segment together to set a new segment.

Figure 13:
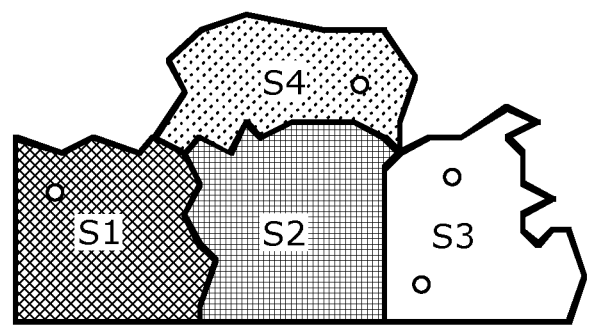
FIG. 13 is a diagram illustrating the segment combine process according to the embodiment 2.
Figure 13:
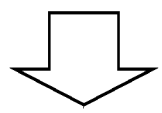
Figure 13:
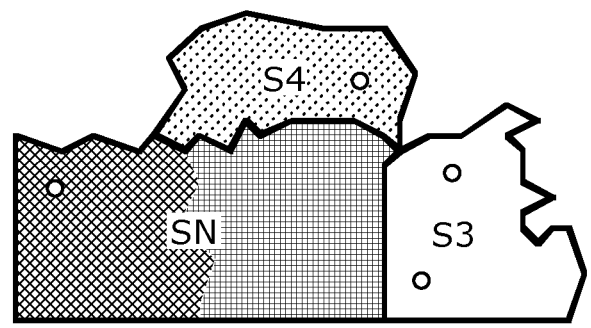

For example, as shown in (a) FIG. 13, when an empty segment S2 and adjacent segments S1, S3, and S4 which are adjacent to the empty segment S2 exist, the segment combine unit 25 selects, from among the plurality of adjacent segments S1, S3, and S4, the adjacent segment S1 that has a color most similar to the color (for example, an average color) of the empty segment S2. Then, as shown in (b) of FIG. 13, the segment combine unit 25 combines the empty segment S2 and the selected adjacent segment S1 to set a new segment SN.

Next, the segment combine unit 25 determines whether an empty segment is present (S404). Here, if no empty segment is present (No in S404), the segment combine unit 25 ends the processing. On the other hand, when an empty segment is present (Yes in S404), the processing returns to step S401 and the segment combine unit 25 executes the processing.

In this manner, an empty segment and an adjacent segment are combined until no further empty segment remains. Then, the depth data generation unit 26 generates the depth data, based on the so combined segments.

As described above, according to the image processing device 20 of the present embodiment, when a plurality of segments include empty segments, the empty segment and an adjacent segment can be combined until no further empty segment remains. Thus, there is no need for the segmentation unit to partition the first image into a plurality of segments so that each segment may always include a representative pixel. In other words, the segmentation can be carried out without considering the correspondence with the representative pixel. As a result, the segmentation and the disparity value calculation on the representative pixel can be processed in parallel, thereby speeding up the depth data generation process.

Moreover, according to the image processing device 20 of the present embodiment, segments having a similar color can be combined together. In other words, regions having a similar color are handled as one segment, and thus, regions having a similar depth are more likely to be set as one segment. By determining the disparity value for each segment thus obtained, the depth data indicative of the depths corresponding to the segments can be generated more accurately.

Moreover, according to the image processing device 20 of the present embodiment, when a segment includes two or more representative pixels, a median value or a mean value of the disparity values of the two or more representative pixels can be determined as the disparity value of the segment. Thus, the disparity value of the segment can readily be determined, thereby reducing the processing load for generating the depth data. Moreover, an error between the disparity value of the segment and the disparity value of each pixel included in the segment can be reduced to relatively small, and thus the depth data can be generated more accurately.

Moreover, according to the image processing device 20 of the present embodiment, the feature points can be calculated as the representative pixels. Thus, the detection of pixels in the second image that correspond to the representative pixels is facilitated, thereby reducing the processing load.

Moreover, according to the image processing device 20 of the present embodiment, an alignment process for rectifying the first image and the second image can be performed. In general, when a multi-view image, such as stereo images, is captured, the alignment process is performed on the mufti-view image. In the alignment process, the feature points are calculated and corresponding points are detected. In other words, the disparity value of the representative pixel can be calculated appropriating results of calculating the feature points and detecting the corresponding points in the alignment process. Thus, the reduction in processing load for generating the depth data is possible.

Variation of Embodiment 2

Next, a variation of the embodiment 2 will be described. In the variation, processing operations of the depth data generation unit 26 is different from the embodiment 2.

Specifically, the depth data generation unit 26 according to the variation interpolates, for each segment, using a disparity value of at least one representative pixel included in the segment, disparity values of other pixels included in the segment, thereby calculating a disparity value for each pixel included in the segment. Then, the depth data generation unit 26 generates as depth data a depth map indicative of the depths of pixels, based on the calculated disparity value of each pixel.

Figure 14:
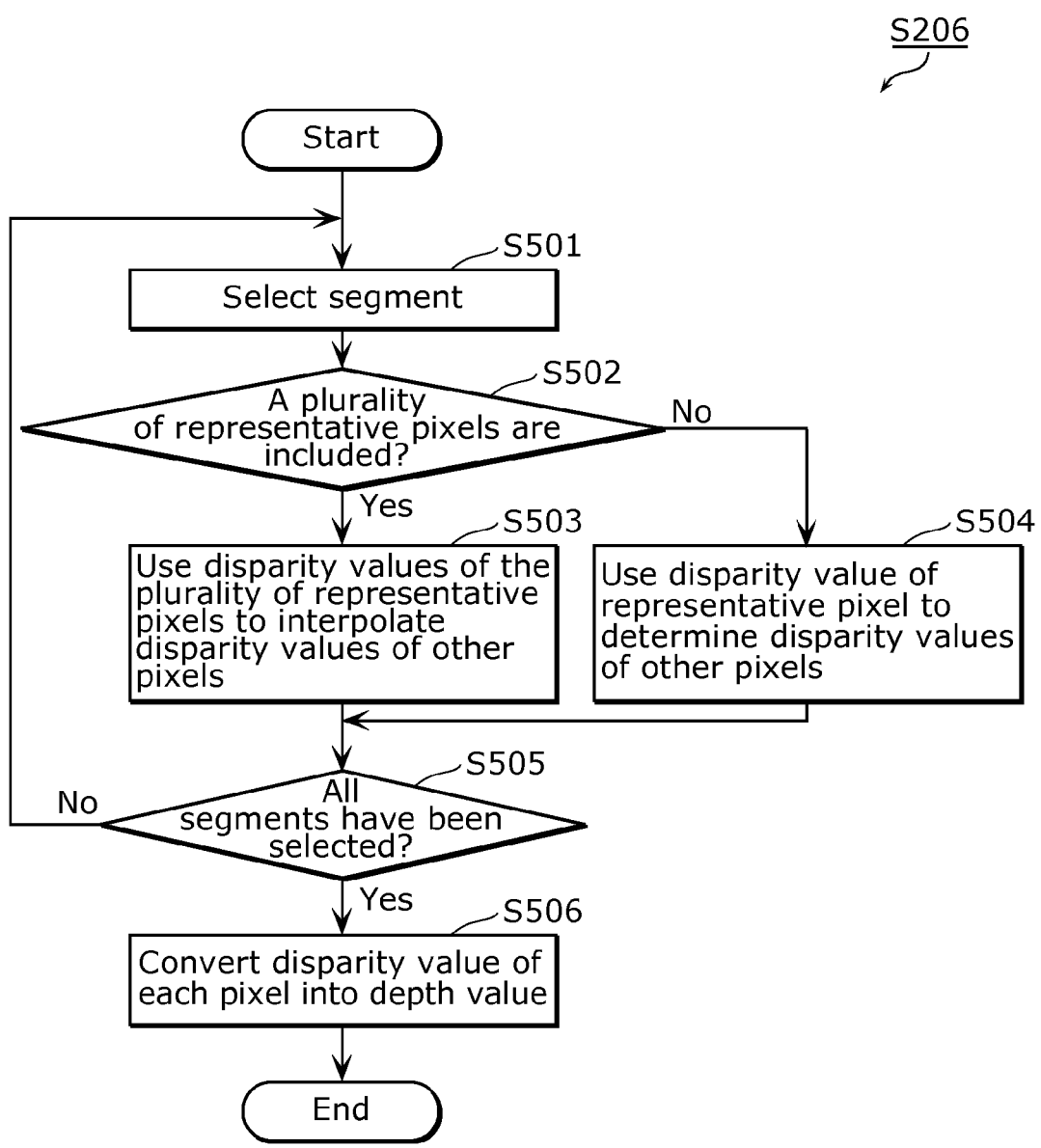
FIG. 14 is a flowchart illustrating details of a depth data generation process according to a variation of the embodiment 2.

Such processing operations of the depth data generation unit 26 according the variation will be described, with reference to FIG. 14. FIG. 14 is a flowchart illustrating details of the depth data generation process according to the variation of the embodiment 2.

First, the depth data generation unit 26 selects one segment from among a plurality of segments in the first image (S501). The depth data generation unit 26 determines whether the selected segment includes a plurality of representative pixels (S502).

Here, when the selected segment includes a plurality of representative pixels (Yes in S502), the depth data generation unit 26 uses disparity values of the plurality of representative pixels to interpolate disparity values of other pixels included in the segment, thereby calculating the disparity value of each pixel included in the segment (S503). For example, the depth data generation unit 26 calculates the disparity values of other pixels by spline interpolation.

On the other hand, when the selected segment includes only one representative pixel (No in S502), the depth data generation unit 26 uses the disparity value of the representative pixel to determine the disparity values of other pixels included in the segment (S504). For example, the depth data generation unit 26 sets the disparity values of all pixels included in the segment to the disparity value of the representative pixel.

Then, the depth data generation unit 26 determines whether all the segments have been selected (S505). Here, if some segment has not been selected (No in S505), the processing returns to the process of step S501.

On the other hand, when all the segments have been selected (Yes in S505), the depth data generation unit 26 converts the disparity values of the pixels into depth values to generate a depth map (depth data) (S506). The conversion from the disparity value to the depth value is based on, for example, triangulation.

As described above, according to the image processing device of the variation, for each segment, the disparity values of other pixels included in the segment can be interpolated using the disparity value of at least one representative pixel included in the segment. Thus, the disparity value of each pixel can be obtained by interpolation, thereby generating the depth data more accurately.

While the image processing device according to one or more embodiments has been described above with reference to the embodiments, the present invention is not limited to the embodiments. Various modifications to the present embodiments that may be conceived by those skilled in the art and combinations of components of different embodiments are intended to be included within the scope of one or more aspects of the invention, without departing from the spirit of the present invention.

For example, in the above embodiment 2, the feature point calculation unit 21 may calculate feature points as representative pixels so that the number of feature points may not exceed a predetermined number. For example, the feature point calculation unit 21 may calculate the feature points so that a plurality of feature points may not be included in a segment. Also for example, the feature point calculation unit 21 may calculate the feature points so that a distance between the feature points may not be less than a predetermined distance. Calculating the feature points in this manner can prevent an increase in the load of processing of detecting pixels corresponding to the representative pixel.

Moreover, while in the above embodiment 2, the segmentation unit 24 performs the segmentation, based on the k-means clustering, the segmentation may be performed based on other clustering methods. For example, the segmentation unit 24 may perform the segmentation, based on mean-shift clustering.

While in the above embodiment 2, the segment combine unit 25 combines segments, based on the color similarity, the segment combine unit 25 may combine segments, based on a similarity in other than color. For example, the segment combine unit 25 may combine segments, based on a brightness similarity.

Moreover, part or the whole of the components included in each of the image processing devices 10 and 20 according to the above embodiments 1 and 2 above may be configured with one system LSI (Large Scale Integration). For example, the image processing device 10 may be implemented in a system LSI which includes the disparity value calculation unit 11, the segmentation unit 12, and the depth data generation unit 13.

The system LSI is a super mufti-function LSI manufactured by integrating a plurality of components on one chip, and is, specifically, a computer system which includes a microprocessor, a read only memory (ROM), a random access memory (RAM), or the like. The computer program is stored in the ROM. The system LSI performs its functionality by the microprocessor operating in accordance with the computer program.

Moreover, here, the term system LSI is used. However, IC, LSI, super LSI, ultra LSI may be used depending on the difference in degree of integration. Moreover, the circuit integration is not limited to the LSI and may be implemented as a dedicated circuit or a general-purpose processor. An FPGA (Field Programmable Gate Array) which is programmable after manufacturing the LSI, or a reconfigurable processor in which connection or settings of circuit cells in LSI is reconfigurable, may be used.

Furthermore, if circuit integration technology emerges replacing the LSI due to advance in semiconductor technology or other technology derived therefrom, the functional blocks may, of course, be integrated using the technology. Application of biotechnology is possible.

Figure 15:
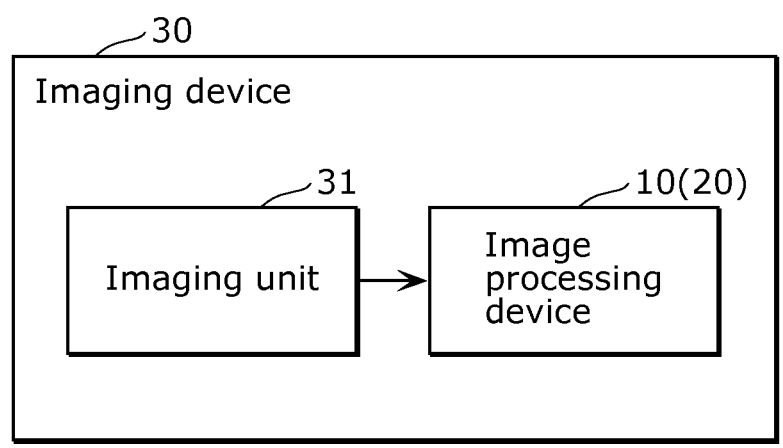
FIG. 15 is a block diagram of the configuration of an imaging device according to an embodiment.

Moreover, such an image processing device may be included in an imaging device. FIG. 15 is a block diagram of the functional configuration of an imaging device 30 according to one embodiment. Examples of the imaging device 30 include digital still cameras and digital video cameras. As shown in FIG. 15, the imaging device 30 includes an imaging unit 31 which captures a first image and a second image from different viewpoints, and any of the image processing devices 10 and 20 according to the above embodiments 1 and 2.

It should be noted that each component in the embodiment may take the form as dedicated hardware or may be implemented by executing a software program suitable for each component. Each component may be implemented by CPU or a program execution unit, such as processor, loading and executing the software program stored in a hard disk or a recording medium such as a semiconductor memory. Here, the software program for implementing the image processing device according to the embodiments is as follows.

Specifically, the program causes a computer to execute an image processing method for generating depth data, utilizing a first image and a second image which are captured from different viewpoints, the image processing method including: calculating, for each of plural representative pixels included in pixels in the first image, a disparity value of the representative pixel, based on a positional relationship between the representative pixel and a pixel corresponding to the representative pixel, in the second image; partitioning the first image into plural segments, based on a similarity between pixel values; and determining, for each segment, a disparity value of the segment, based on the disparity value of the representative pixel included in the segment to generate depth data indicative of depths corresponding to the plural segments.

INDUSTRIAL APPLICABILITY

The present invention can be used as an image processing device which can generate depth data, using a first image and a second image captured from different viewpoints, and imaging devices, such as digital cameras and digital video cameras, which include the image processing device.

REFERENCE SIGNS LIST 10, 20 Image processing device
11, 23 Disparity value calculation unit
12, 24 Segmentation unit
13, 26 Depth data generation unit
21 Feature point calculation unit
22 Alignment processing unit
25 Segment combine unit
27 Image processing unit
30 Imaging device
31 Imaging unit
101 First image
102 Second image

The invention claimed is:

1. An image processing device for generating depth data, utilizing a first image and a second image which are captured from different viewpoints, the image processing device comprising:
a processor; and
a non-transitory computer-readable medium having instructions stored thereon that, when executed by the processor, cause the image processing device to function as:
a disparity value calculation unit configured to calculate, for each of plural representative pixels included in pixels in the first image, a disparity value of the representative pixel, based on a positional relationship between the representative pixel and a pixel corresponding to the representative pixel, in the second image;
a segmentation unit configured to partition the first image into plural segments, based on a similarity between pixel values;
a segment combine unit configured to select an empty segment which includes no representative pixel from among the plural segments, and combine the empty segment and a segment adjacent to the empty segment together; and
a depth data generation unit configured to determine, for each segment, a disparity value of the segment, based on the disparity value of the representative pixel included in the segment to generate depth data indicative of depths corresponding to the plural segments,
wherein the depth data generation unit is configured to generate the depth data, based on a segment obtained by the segment combine unit combining the empty segment and the segment adjacent to the empty segment together.

2. The image processing device according to claim 1,
wherein when the empty segment is adjacent to plural segments, the segment combine unit is configured to:
select at least one segment from among the plural segments, based on a color similarity; and
combine the selected at least one segment and the empty segment together.

3. The image processing device according to claim 1,
wherein when a segment among the plural segments includes two or more representative pixels, the depth data generation unit is configured to determine a median value or a mean value of disparity values of the two or more representative pixels as the disparity value of the segment.

4. The image processing device according to claim 1,
wherein the depth data generation unit is configured to:
interpolate, for each segment, using a disparity value of at least one representative pixel included in the segment, a disparity value of another pixel included in the segment to calculate a disparity value of each pixel included in the segment; and
generate a depth map indicative of depths of the pixels as the depth data, based on the calculated disparity values of the pixels.

5. The image processing device according to claim 1,
wherein the segmentation unit is configured to partition the first image into plural segments by clustering based on a similarity defined using pixel values and pixel locations.

6. The image processing device according to claim 5,
wherein the clustering is k-means clustering.

7. The image processing device according to claim 1,
wherein the instructions, when executed by the processor, cause the image processing device to further function as a feature point calculation unit configured to calculate a feature point in the first image, as one of the representative pixels.

8. The image processing device according to claim 7,
wherein the instructions, when executed by the processor, cause the image processing device to further function as an alignment processing unit configured to perform, using the feature point, an alignment process for rectifying the first image and the second image, and
wherein the disparity value calculation unit is configured to calculate the disparity value of the representative pixel, using the first image and the second image on which the alignment process has been performed.

9. The image processing device according to claim 1,
wherein the instructions, when executed by the processor, cause the image processing device to further function as an image processing unit configured to separate, based on the depth data, the first image into a foreground region and a background region, and apply blurring to the background region.

10. The image processing device according to claim 1,
wherein the instructions, when executed by the processor, cause the image processing device to further function as an image processing unit configured to separate, based on the depth data, the first image into a foreground region and a background region, and synthesize the foreground region with a third image different from the first image and the second image.

11. An imaging device comprising:
the processing device according to claim 1; and
an imaging unit configured to capture the first image and the second image.

12. An image processing method for generating depth data, utilizing a first image and a second image which are captured from different viewpoints, the image processing method comprising:
 (a) calculating, for each of plural representative pixels included in pixels in the first image, a disparity value of the representative pixel, based on a positional relationship between the representative pixel and a pixel corresponding to the representative pixel, in the second image;
 (b) partitioning the first image into plural segments, based on a similarity between pixel values;
 (c) selecting an empty segment which includes no representative pixel from among the plural segments, and combining the empty segment and a segment adjacent to the empty segment together; and
 (d) determining, for each segment, a disparity value of the segment, based on the disparity value of the representative pixel included in the segment to generate depth data indicative of depths corresponding to the plural segments,
wherein in step (d), the depth data is generated based on a segment obtained in step (c).

13. A non-transitory computer-readable storage medium having stored therein a program for causing a computer to execute the image processing method according to claim 12.

14. An integrated circuit for generating depth data, utilizing a first image and a second image which are captured from different viewpoints, the integrated circuit comprising:
 a disparity value calculation circuit configured to calculate, for each of plural representative pixels included in pixels in the first image, a disparity value of the representative pixel, based on a positional relationship between the representative pixel and a pixel corresponding to the representative pixel, in the second image;
 a segmentation circuit configured to partition the first image into plural segments, based on a similarity between pixel values;
 a segment combine circuit configured to select an empty segment which includes no representative pixel from among the plural segments, and combine the empty segment and a segment adjacent to the empty segment together; and
 a depth data generation circuit configured to determine, for each segment, a disparity value of the segment, based on the disparity value of the representative pixel included in the segment to generate depth data indicative of depths corresponding to the plural segments,
wherein the depth data generation circuit is configured to generate the depth data, based on a segment obtained by the segment combine circuit combining the empty segment and the segment adjacent to the empty segment together.

* * * * *

UNITED STATES PATENT AND TRADEMARK OFFICE
CERTIFICATE OF CORRECTION

| | | |
|---|---|---|
| PATENT NO. | : 9,153,066 B2 | Page 1 of 1 |
| APPLICATION NO. | : 14/113114 | |
| DATED | : October 6, 2015 | |
| INVENTOR(S) | : Yasunori Ishii | |

It is certified that error appears in the above-identified patent and that said Letters Patent is hereby corrected as shown below:

On the Title Page:

In item (73) "PANASONIC INTELLECTUAL PROPERTY MANAGEMENT CO. LTD., Osaka (JP)" should read --PANASONIC INTELLECTUAL PROPERTY MANAGEMENT CO., LTD., Osaka (JP)--

Signed and Sealed this
Twenty-third Day of February, 2016

Michelle K. Lee
*Director of the United States Patent and Trademark Office*